(12) United States Patent
Wei et al.

(10) Patent No.: US 9,697,612 B2
(45) Date of Patent: Jul. 4, 2017

(54) GEODESIC SALIENCY USING BACKGROUND PRIORS

(71) Applicant: Microsoft Technology Licensing, LLC, Redmond, WA (US)

(72) Inventors: Yichen Wei, Beijing (CN); Fang Wen, Beijing (CN); Jian Sun, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/890,884

(22) PCT Filed: Jul. 31, 2013

(86) PCT No.: PCT/CN2013/080491
§ 371 (c)(1),
(2) Date: Nov. 12, 2015

(87) PCT Pub. No.: WO2015/013908
PCT Pub. Date: Feb. 5, 2015

(65) Prior Publication Data
US 2016/0163058 A1    Jun. 9, 2016

(51) Int. Cl.
*G06K 9/00*    (2006.01)
*G06T 7/00*    (2017.01)
(Continued)

(52) U.S. Cl.
CPC .......... *G06T 7/0081* (2013.01); *G06K 9/3233* (2013.01); *G06T 7/11* (2017.01);
(Continued)

(58) Field of Classification Search
CPC ... G06T 7/0081; G06T 7/0042; G06T 7/0083; G06T 7/0093; G06T 7/2033; G06T 2207/20072
See application file for complete search history.

(56) References Cited

U.S. PATENT DOCUMENTS 6,278,798 B1 *  8/2001  Rao ..................... G06K 9/6211
                                                   382/154
7,773,807 B2 *  8/2010  Grady .................. G06K 9/469
                                                   382/173
(Continued)

FOREIGN PATENT DOCUMENTS

CN      101477695 A    7/2009
CN      102521849 A    6/2012
CN      102024262 A    4/2014

OTHER PUBLICATIONS

Supplementary European Search Report mailed Sep. 21, 2016 for European Patent Application No. 13890476.8, 3 pages.
(Continued)

*Primary Examiner* — Eueng-Nan Yeh
(74) *Attorney, Agent, or Firm* — Lee & Hayes, PLLC

(57) ABSTRACT

Disclosed herein are techniques and systems for computing geodesic saliency of images using background priors. An input image may be segmented into a plurality of patches, and a graph associated with the image may be generated, the graph comprising nodes and edges. The nodes of the graph include nodes that correspond to the plurality of patches of the image plus an additional virtual background node that is added to the graph. The graph further includes edges that connect the nodes to each other, including internal edges between adjacent patches and boundary edges between those patches at the boundary of the image and the virtual background node. Using this graph, a saliency value, called the "geodesic" saliency, for each patch of the image is determined as a length of a shortest path from a respective patch to the virtual background node.

20 Claims, 10 Drawing Sheets

(51) Int. Cl.
 *G06K 9/32* (2006.01)
 *G06T 7/11* (2017.01)
 *G06T 7/162* (2017.01)
 *G06T 7/194* (2017.01)
 *G06T 7/136* (2017.01)
(52) U.S. Cl.
 CPC .............. *G06T 7/136* (2017.01); *G06T 7/162* (2017.01); *G06T 7/194* (2017.01); *G06T 2207/20164* (2013.01)

(56) References Cited

U.S. PATENT DOCUMENTS 8,437,570 B2  5/2013  Criminisi et al.
2011/0229025 A1  9/2011  Zhao et al.

OTHER PUBLICATIONS

Wei, et al., "Geodesic Saliency Using Background Priors", Computer Vision ECCV, Springer-Verlag Berlin Heidelberg, 2012, pp. 29-42 (published before this application Nov. 2015).
Achanta, et al., "Frequency-Tuned Salient Region Detection", IEEE Conference on Computer Vision and Pattern Recognition, Jun. 2009, 8 pages.
Alexe, et al., "What is an Object", IEEE Conference on Computer Vision and Pattern Recognition, Jun. 2010, 8 pages.
Bai, et al., "Geodesic Matting: A Framework for Fast Interactive Image and Video Segmentation and Matting", IEEE 11th Annual International Conference on Computer Vision, Oct. 2007, 20 pages.
Bruce, et al., "Saliency Based on Information Maximization", Neural Information Processing Systems, Dec. 2005, 8 pages.
Butko, , et al., "Optimal Scanning for Faster Object Detection", IEEE Conference on Computer Vision and Pattern Recognition, Jun. 2009, 8 pages.
Cheng, et al., "Global Contrast Based Salient Region Detection", Proceedings of the IEEE Conference on Computer Vision and Pattern Recognition, Jun. 2011, 8 pages.
Criminisi, et al., "GeoS: Geodesic Image Segmentation" 10th European Conference on Computer Vision, Oct. 2008, 14 pages.
Feng, et al., "Salient Object Detection by Composition" IEEE International Conference on Computer Vision, Nov. 2011, 8 pages.
Gao, et al., "The Discriminant Center-Surround Hypothesis for Bottom-Up Saliency", Proceedings of the Twenty-First Annual Conference on Neural Information Processing Systems, Dec. 2007, 8 pages.
Goferman, et al., "Context-Aware Saliency Detection", IEEE Conference on Computer Vision and Pattern Recognition, Jun. 2010, 8 pages.
Grady, et al., "Segmentation from a Box", IEEE International Conference on Computer Vision, Nov. 2011, 8 pages.
Harel, et al., "Graph-Based Visual Saliency", Proceedings of the Twentieth Annual Conference on Neural Information Processing Systems, Dec. 2012, 8 pages.
Hou, et al., "Saliency Detection—A Spectral Residual Approach" IEEE International Conference on Computer Vision, Jun. 2007, 8 pages.
Itti, et al., "A Model of Saliency-Based Visual Attention for Rapid Scene Analysis", Journal of IEEE Transactions on Pattern Analysis and Machine Intelligence, vol. 20, Issue 11, Nov. 1998, 6 pages.
Itti, et al., "Bayesian Surprise Attracts Human Attentions", Neural Information Processing Systems, Dec. 2005, 8 pages.
Jiang, Richard M.,, "Geodesic-based Salient Object Detection", arXiv Preprint 1302.6557, Feb. 2013, 14 pages.
Judd, et al., "Learning to Predict Where Humans Look" IEEE 12th International Conference on Computer Vision, Sep. 2009, 8 pages.
Klein, et al., "Center-Surround Divergence of Feature Statistics for Salient Object Detection", IEEE International Conference on Computer Vision, Nov. 2011, 6 pages.

Lempitsky, et al., "Image Segmentation with a Bounding Box Prior" IEEE 12th International Conference on Computer Vision, Sep. 2009, 11 pages.
Liu, et al., "Learning to Detect a Salient Object", IEEE Computer Society Conference on Computer Vision and Pattern Recognition, Jun. 2007, 8 pages.
Marchesotti, et al., "A Framework for Visual Saliency Detection with Applications to Image Thumbnailing", IEEE 12th International Conference on Computer Vision, Sep. 2009, 8 pages.
Martin, et al., "A Database of Human Segmented Natural Images and its Application to Evaluating Segmentation Algorithms and Measuring Ecological Statistics", Proceedings of the Eighth International Conference on Computer Vision, Jul. 2001, 8 pages.
Moosmann, et al., "Learning Saliency Maps for Object Categorization" ECCV International Workshop on the Representation and Use of Prior Knowledge in Vision, May 2006, 14 pages.
Movahedi, et al., "Design and Perceptual Validation of Performance Measures for Salient Object Segmentation", IEEE Computer Society Conference on Computer Vision and Pattern Recognition Workshops, Jun. 2010, 8 pages.
Nowozin, et al., "Global Connectivity Potentials for Random Field Models", IEEE Conference on Computer Vision and Pattern Recognition, Jun. 2009, 8 pages.
Parkhurst, et al., "Modeling the Role of Salience in the Allocation of Overt Visual Attention", Journal of Vision Research, vol. 42, Issue 1, Jan. 2002, 17 pages.
PCT Search Report and Written Opinion mailed Apr. 29, 2014 for PCT Application No. PCT/CN2013/080491, 12 pages.
Ramanathan, et al., "An Eye Fixation Database for Saliency Detection in Images" Proceedings of the 11th European Conference on Computer Vision, Sep. 2010, 14 pages.
Ren, et al., "Improved Saliency Detection Based on Superpixel Clustering and Saliency Propagaton", Proceedings of the International Conference on Multimedia, Oct. 2010, 4 pages.
Rubinstein, et al., "A Comparative Study of Image Retargeting" Proceedings of the ACM SIGGRAPH Asia, vol. 29, Issue 6, Dec. 2010, 10 pages.
Seo, et al., "Visual Saliency for Automatic Target Detection, Boundary Detection and Image Quality Assessment", IEEE International Conference on Acoustics Speech and Signal Processing, Mar. 2010, 4 pages.
Sun, et al., "Scale and Object Aware Image Retargeting for Thumbnail Browsing" Proceedings of the International Conference on Computer Vision, Nov. 2011, 8 pages.
Toivanen, "New Geodesic Distance Transforms for Gray Scale Images", Journal of Pattern Recognition Letters, vol. 17, Issue 5, May 1996, 14 pages.
Veksler, et al., "Superpixels and Supervoxels in an Energy Optimization Framework" Proceedings of the 11th European Conference on Computer Vision: Part V, Sep. 2010, 14 pages.
Vicente, et al., "Graph cut based image segmentation with connectivity priors", IEEE Conference on Computer Vision and Pattern Recognition, Jun. 2008, 8 pages.
Wang, et al., "Automatic Salient Object Extraction with Contextual Cue", IEEE International Conference on Computer Vision, Sep. 2009, 8 pages.
Yang, et al., "Saliency Detection via Graph-Based Manifold Ranking" IEEE Conference on Computer Vision and Pattern Recognition, Jun. 2013, 8 pages.
Yang, et al., "Top-Down Visual Saliency via Joint CRF and Dictionary Learning", IEEE Conference on Computer Vision and Pattern Recognition, Jun. 2012, 8 pages.
Zhai, et al., "Visual Attention Detection in Video Sequences Using Spatiotemporal Cues" Proceedings of the 14th Annual ACM International Conference on Multimedia, Oct. 2006, 9 pages.
Office Action Issued in European Patent Application No. 13890476. 8, Mailed Date: Oct. 17, 2016, 6 Pages.

* cited by examiner

GEODESIC SALIENCY USING BACKGROUND PRIORS

CROSS-REFERENCE TO RELATED APPLICATIONS

This application is a non-provisional of, and claims priority to PCT Application No. PCT/CN2013/080491, filed on Jul. 31, 2013, which is incorporated by reference herein in its entirety.

BACKGROUND

The human vision system can rapidly and accurately identify important regions in its visual field. In order to replicate this capability in computer vision, various saliency detection methods have been developed to find pixels or regions in an input image that are of the highest visual interest or importance. Often the "important" pixels/regions carry some semantic meaning, such as being part of an object (e.g., person, animal, structure, etc.) in the foreground of the image that stands out from the background of the image. Object level saliency detection can be used for various computer vision tasks, such as image summarization and retargeting, image thumbnail generation, image cropping, object segmentation for image editing, object matching and retrieval, object detection and recognition, to name a few.

Although the general concept of computing saliency of an input image seems logical and straightforward, saliency detection is actually quite difficult in the field of computer vision due to the inherent subjectivity of the term "saliency." That is, the answer to the question of what makes a pixel/region of an image more or less salient can be highly subjective, poorly-defined and application dependent, making the task of saliency detection quite challenging.

Current techniques for detecting saliency in an image have tried to tackle the problem by using various "bottom-up" computational models that predominantly rely on assumptions (or priors) of the image relating to the contrast between pixels/regions of the image. That is, current saliency detection algorithms rely on the assumption that appearance contrast between objects in the foreground and the background of the image will be relatively high. Thus, a salient image pixel/patch will present high contrast within a certain context (e.g., in a local neighborhood of the pixel/patch, globally, etc.). This known assumption is sometimes referred to herein as the "contrast prior."

However, detecting saliency in an image using the contrast prior alone is insufficient for accurate saliency detection because the resulting saliency maps tend to be very different and inconsistent among the various implementations using the contrast prior alone. In some cases, the interior of objects are attenuated or not highlighted uniformly. A common definition of "what saliency is" is still lacking in the field of computer vision, and simply using the contrast prior alone is unlikely to generate accurate saliency maps of images. FIG. 1 illustrates four example object-level saliency detection techniques as compared across three input images 100 and their corresponding ground truth salient object masks 102. As can be seen in FIG. 1, the techniques 104-110 produce resulting saliency maps that vary significantly between each other, even for a simple input image such as the image of the tomato shown at the top of column 100 in FIG. 1. The results of techniques shown in FIG. 1 demonstrates that using the contrast prior alone is insufficient for achieving suitable saliency maps of input images.

SUMMARY

Described herein are techniques and systems for computing geodesic saliency of images using background priors. Embodiments disclosed herein focus on the background, as opposed to focusing on the object, by exploiting assumptions (or priors) about what common backgrounds should look like in natural images simultaneously with the contrast prior. These background priors naturally provide more clues as to the salient regions of an image.

In some embodiments, systems, computer-readable media and processes for creating a saliency map of an input image are disclosed where the process includes segmenting the input image into a plurality of patches, and generating a graph associated with the image comprised of nodes and edges. In some embodiments, the patches correspond to regions of the image comprised of multiple pixels, but the process may be implemented with single-pixel segmentation, or patches of a single image pixel. The nodes of the graph include nodes that correspond to the plurality of patches of the image plus an additional virtual background node that is added to the set of nodes of the graph. The graph further includes edges that connect the nodes to each other, including internal edges between adjacent patches and boundary edges between those patches at the boundary of the image and the virtual background node. Using this graph, a saliency value for each patch of the image is determined as a length of a shortest path (i.e., geodesic distance) from a respective patch to the virtual background node. Thus, the saliency measure disclosed herein is sometimes called the "geodesic saliency."

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Embodiments of the present disclosure are directed to, among other things, techniques and systems for saliency detection in images, and more particularly to determining object-level saliency of an input image using a geodesic saliency measure that is based in part on background priors. Embodiments disclosed herein find particular application for computer vision applications that benefit from object detection, although the applications described herein are provided merely as examples and not as a limitation. As those skilled in the art will appreciate, the techniques and systems disclosed herein are suitable for application in a variety of different types of computer vision and image processing systems. In addition, although input images are discussed primarily in terms of natural photographs or digital images, it is to be appreciated that the input images may include various types of images such as video images/frames or other types of images such as medical images, infra-red images, x-ray images or any other suitable type of image.

The techniques and systems described herein may be implemented in a number of ways. Example implementations are provided below with reference to the following figures.

Example Architecture

Figure 2:
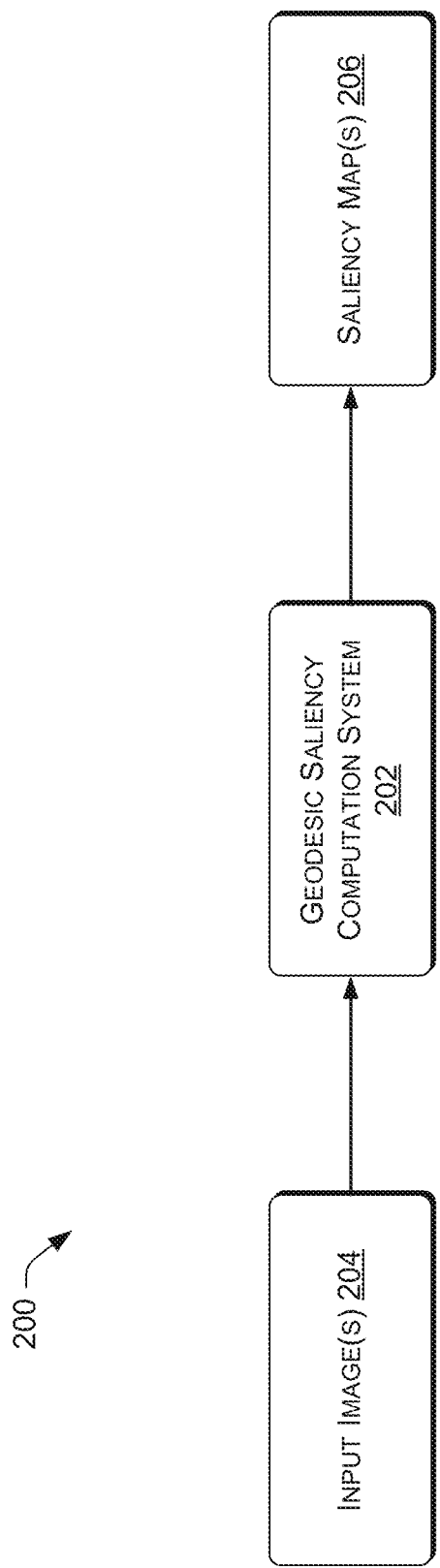
FIG. 2 is a high level schematic diagram of an example geodesic saliency computation system showing an input image(s) and an output saliency map(s).

FIG. 2 is a high level schematic diagram of an example environment 200 including a geodesic saliency computation system 202. FIG. 2 shows one or more input images 204 as being received by the geodesic saliency computation system 202, and one or more output saliency maps 206 being output from the system 202. The geodesic saliency computation system 202 may be implemented using any suitable type of processor such as a computer having software as known in the art suitable for implementing the invention. An example computing system that may be implemented as the geodesic saliency computation system 202 will be described in more detail below with respect to FIG. 10.

The geodesic saliency computation system 202 may be configured to receive images 204, compute saliency of those images 204, and output saliency maps 206 for those images 204 reflecting the computed saliency. The input images 204 may be provided by any suitable means such as an image capture device of any suitable type such as a camera, medical imaging device, video camera or the like that may be part of, or separate from, the geodesic saliency computation system 202. In some instances, the input images 204 may be received via a communications link, disk drive, Universal Serial Bus (USB) connection or other suitable input means to input previously obtained images 204 or images 204 obtained in real-time.

Figure 1:
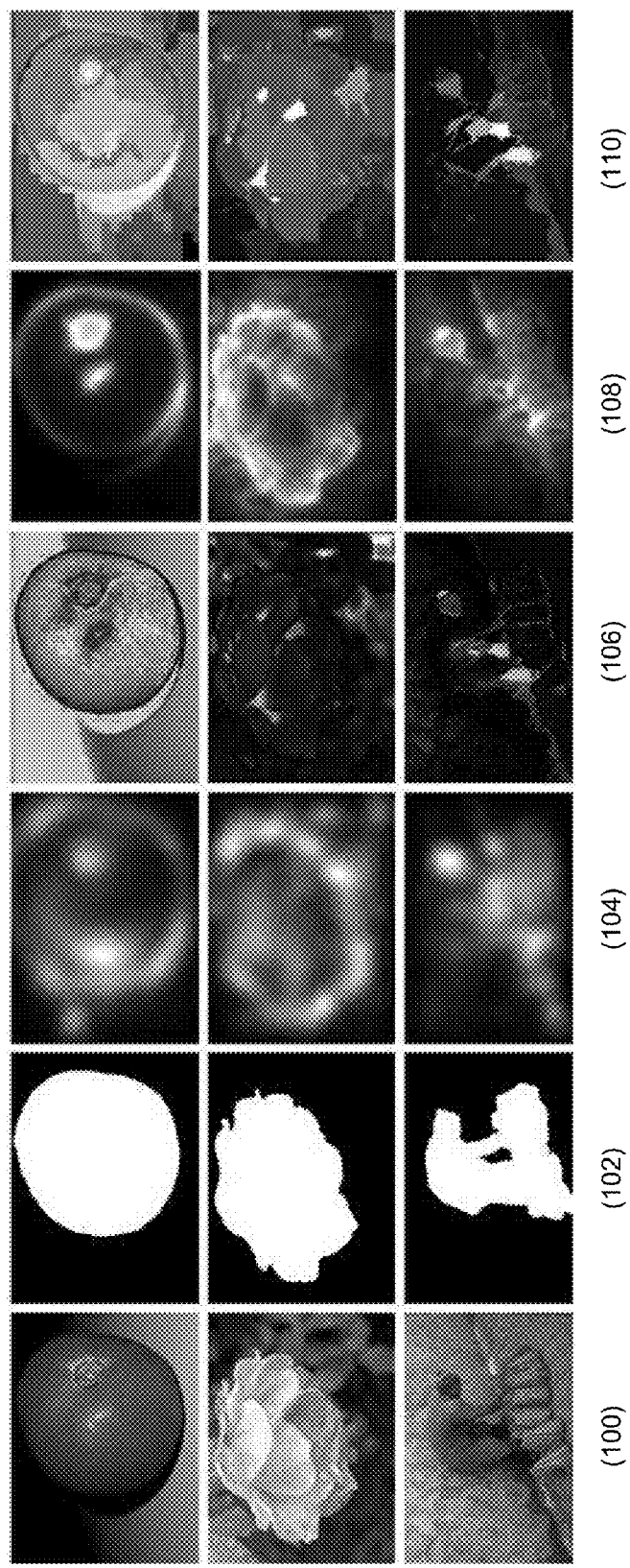
FIG. 1 illustrates four example object-level saliency detection techniques as compared across three different input images.

The output saliency maps 206 are generally the same size of the input images 204, and they present a visual representation of the saliency (i.e., importance or visual interest) of each image element (e.g., pixel, or group of pixels) of the input image 204 by showing an intensity value at each image element. That is, each point in the saliency map 206 is represented by a number (e.g., a real number from 0 to 1) that is indicative of the saliency of the corresponding image element in the image 204. For example, a saliency value of 1 (e.g., object element) indicates that the image element is of significant interest, and it may be visually represented as a white image element with a maximum intensity, whereas a saliency value of 0 (e.g., background element) indicates that the image element is of no interest, and it may be visually represented as a black image element with a minimum intensity. Saliency values in between 0 and 1 are gradients on a spectrum of saliency values in between maximum and minimum intensities that may be indicative of image elements that are of some importance. The ideal saliency map reflects the ground truth mask (e.g., the ground truth masks shown in column 102 of FIG. 1) as close as possible. An output configured to present the saliency map 206 may be of any suitable type such as a graphical user interface (GUI), a file or any other suitable output.

Figure 3:
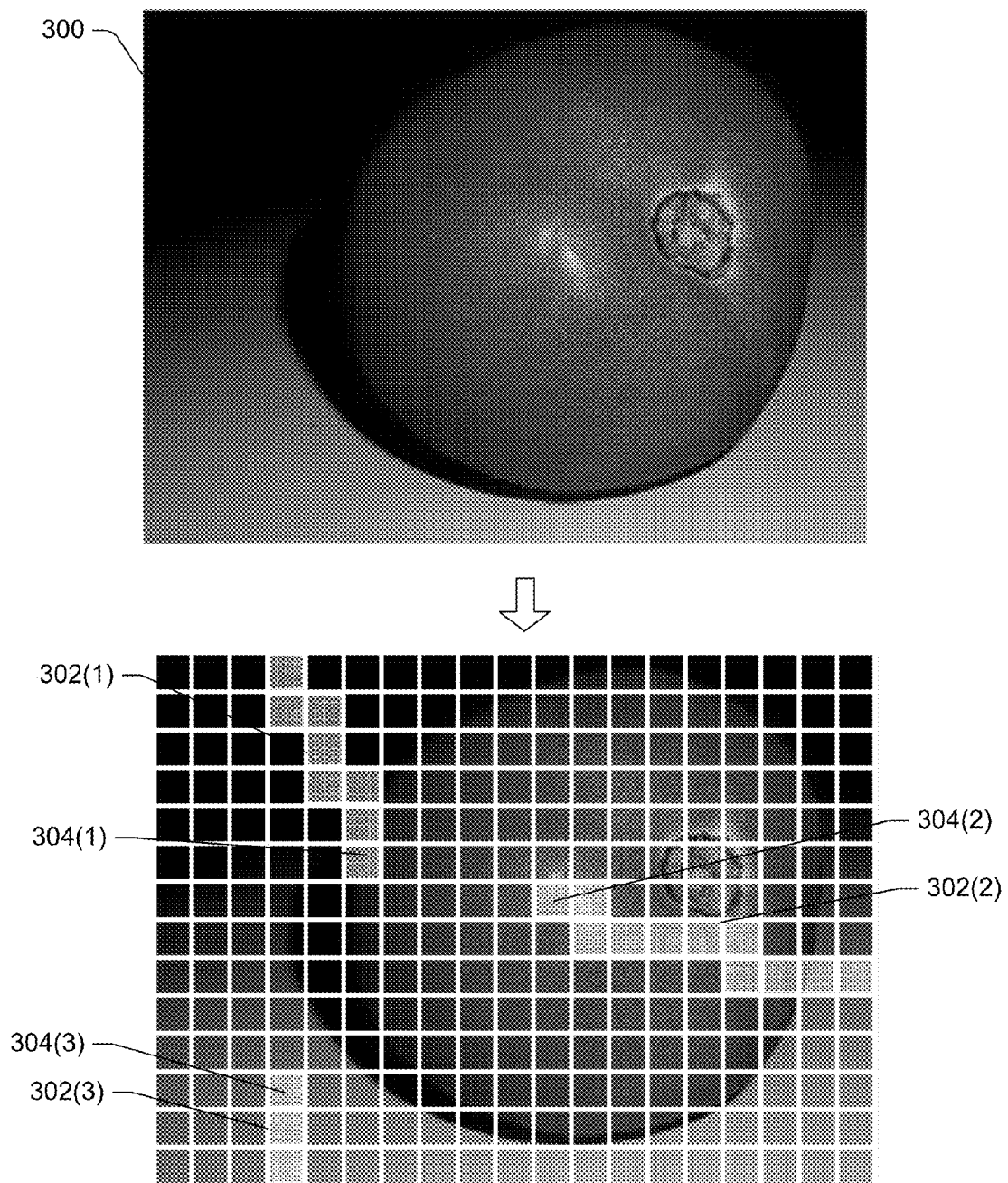
FIG. 3 illustrates an example input image that has been segmented into a plurality of patches, and a visual representation of the shortest paths from each of three example patches to the image boundary.

In a typical scenario, the input image 204 received by the geodesic saliency computation system 202 is a natural image that includes one or more objects in the field of view of the image 204 that may be of high visual interest. With reference to FIG. 3, an example input image 300 is shown, which is a photograph of a tomato resting on a flat surface. This example input image 300 contains an object (the tomato) that makes up a region in the center of the image 300, and the remaining portion of the image 300 is the background of the image 300. In this example, the background is a large, smoothly-connected region, and it should not be considered as foreground in any way. In other words, the background should always have a saliency value of zero, indicative of the fact that it is not of visual interest.

For saliency detection, instead of asking what the salient object(s) is, the approach of the embodiments disclosed herein asks the opposite question; namely, what part of the image is not salient (i.e., what is the background)? To answer this question, the disclosed embodiments utilize two priors (or common knowledge) about common backgrounds in natural images: (1) a boundary prior, and (2) a connectivity prior.

The boundary prior comes from a basic rule of photographic composition: most photographers will not crop salient objects along the view frame. In other words, the image boundary is most often substantially background; hence the name "boundary" prior. For example, the input image 300 of FIG. 3 includes the object (i.e., the tomato) fully contained in the image 300 such that it is not cropped at the boundary, and therefore, the boundary of the image is part of the background and the background prior is valid for the image 300. The background prior disclosed herein is not to be confused with a different prior known as the "center prior" which states that the image center is more important. By contrast, the boundary prior disclosed herein may still be satisfied even when objects are off-center with respect to the image, so long as they are not cropped at the boundary of the image. In other words, salient objects may be positioned near the image boundary, but they are usually not cropped at the boundary, according to the boundary prior. There are of course exceptions to the boundary prior (e.g., people cropped at the bottom boundary of the image), which will be discussed in further detail below, but the boundary prior holds true for most natural images.

The connectivity prior comes from the appearance characteristics of real world background images, and is based on the notion that background regions are usually large, continuous, and homogeneous. In other words, most image regions in the background can be easily connected to each other. Additionally, connectivity is in a piecewise manner. For example, sky and grass regions in the background are homogenous by themselves, but inter-region connection between the sky and grass regions is more difficult. Furthermore, homogeneity of background appearance is to be interpreted in terms of human perception. For example, regions in the grass all look visually similar to humans, although their pixel-wise intensities might be quite different. The connectivity prior is not to be confused with the connectivity prior used commonly in object segmentation, which is assumed on the spatial continuity of the object. Instead, the connectivity prior disclosed herein is based on common knowledge of the background, not the object. In some cases, background regions of natural images are out of focus, which supports the connectivity prior to an even greater degree since out-of-focus backgrounds tend to be more blurred and homogeneous by nature.

With these two background priors in mind, and in light of known contrast priors used in saliency detection methods, it can be observed that most background regions can be easily connected to image boundaries. This cannot be said for object regions, which tend to be more difficult to connect to the image boundaries. Accordingly, the saliency of an image region may be defined, at least in some cases, as a length of a shortest path to the image boundary.

FIG. 3 illustrates a visual representation of the shortest paths 302(1), 302(2) and 302(3) that may be determined between each of three patches 304(1), 304(2) and 304(3) (or regions) in the image 300 and the image boundary. The patches 304 may be defined/created by segmenting the image 300 according to various techniques. FIG. 3 shows the image 300 divided into 266 patches 304, but the number of patches 304 is somewhat arbitrary, with an ideal patch size that will be discussed in more detail below. In some embodiments, the patches 304 correspond to regions of the image comprised of multiple image pixels, but embodiments disclosed herein are not limited to implementation with multi-pixel patches 304, as shown in FIG. 3, and may additionally, or alternatively, be implemented with patches 304 comprising a single image pixel.

With the patches 304 defined, a graph G may be generated and associated with the image 300 where the graph G is comprised of nodes (or vertices) V and edges E. The nodes V of the graph G include nodes that correspond to the plurality of patches 304 of the image 300. The graph G further includes edges E that connect adjacent ones of the nodes V to each other. Using this graph G, a saliency value for each patch 304 of the image 300 may be determined as a length of a shortest path from a respective patch 304 to the image boundary, such as the paths 302(1)-(3) shown in FIG. 3.

However, the technique illustrated by FIG. 3 assumes that all boundary patches (i.e., patches 304 at the image boundary) are background, which is not always realistic given the fact that a salient object can be partially cropped on the boundary of the image. One illustrative example of this situation is illustrated in the input image 400 shown in FIG. 4. In the image 400, the salient object is a person who is cropped at the bottom boundary of the image 400. In this scenario, the strict assumption that the boundary patches are background does not hold. It follows that the shortest paths 402(1), 402(2) and 402(3) from the example patches 404(1), 404(2) and 404(3) to the image boundary in FIG. 4 may not always be indicative of the true saliency values of those patches 404. For example, the shortest path 402(2) from the patch 404(2) (which happens to be an object patch) to the image boundary would have a relatively small length due to the fact that the patch 404(2) is relatively easily connected to the image boundary at the bottom of the image 400. This would in turn lead to a low saliency value of patch 404(2) to indicate that it is likely the background of the image 400, which is not the case.

Figure 4:
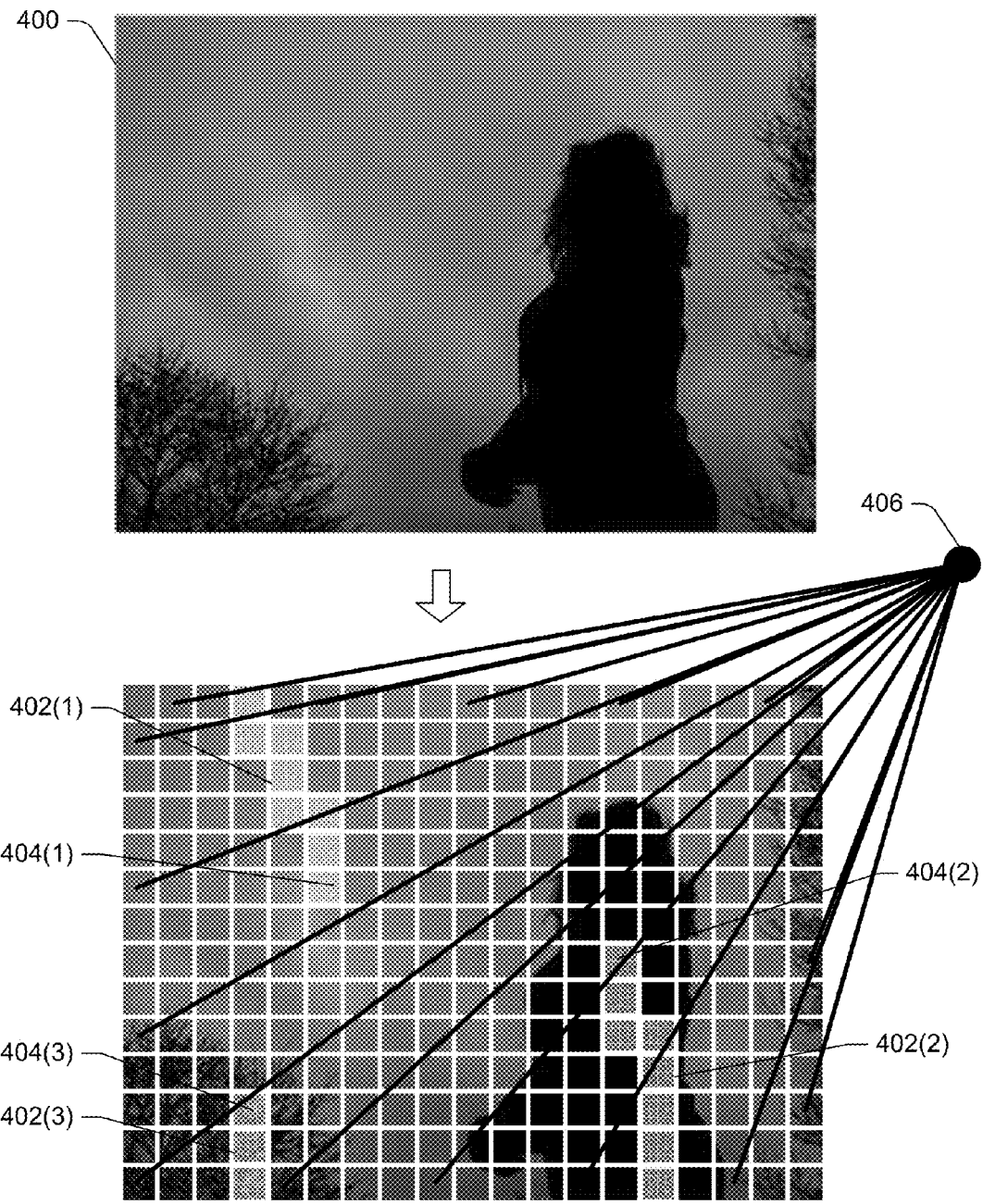
FIG. 4 illustrates an example input image that has been segmented into a plurality of patches, with the addition of a virtual background node, where the geodesic distance between each patch and the virtual background node may be determined.

Accordingly, the saliency measure of the embodiments disclosed herein can be made more robust by adding a virtual background node (or vertex) 406 to the nodes V of the graph G. The virtual background node 406 may be connected to all of those nodes that correspond to patches 404 at the boundary of the image 400. FIG. 4 shows the virtual boundary node 406 connected to only some of the boundary patches for purposes of reducing clutter in the illustration of FIG. 4, but it is to be appreciated that the virtual background node 406 may be connected to all of the boundary patches. Using this modified graph G, as visually depicted in FIG. 4, the saliency value for each patch 404 of the image 400 may be determined as a length of a shortest path from a node corresponding to a respective patch 404 to the virtual background node 406. This measure of saliency for each of the patches 404 is called the "geodesic saliency" because it is the geodesic distance between each node V corresponding to a respective patch 404 and the virtual background node 406. In this scenario, the saliency of each of the boundary patches is also computed, as will be described in more detail below with reference to FIG. 5. FIG. 4 shows three example shortest paths 402(1)-(3) for the patches 404(1)-(3) in the image 400. By using the geodesic saliency measure illustrated by FIG. 4, all of the patches 404 that are inside the object (in this case, the person) will have similar shortest paths to the virtual background node 406 and therefore similar saliency. Those patches 404 that are in the background of the image 400 will also have similar shortest paths to the virtual background node 406 among themselves.

The graph G that is generated to represent the image 400 of FIG. 4 may be an undirected, weighted graph G={V, E}. The nodes V correspond to all of the image patches $\{P_i\}$ plus an additional virtual background node B, such that V=$\{P_i\} \cup \{B\}$. The undirected nature of the edges E is such that each edge E disregards any sense of direction, and both of the nodes V that are connected by each edge E are treated interchangeably, without any implication of order. There are two types of edges E: (1) internal edges that connect all adjacent patches 404, and (2) boundary edges that connect those patches 404 at the image boundary to the virtual background node 406, such that E=$\{(P_i, P_j) | P_i$ is adjacent to $P_j\} \cup \{(P_i, B) | P_i$ is on the image boundary$\}$.

Two nodes are adjacent when they are both incident to a common edge. The edges E are also associated with weights (sometimes called "labels" or "costs," and sometimes abbreviated as "wt.") that may be real numbers. In some embodiments, the weights of the edges E may be restricted to rational numbers or integers. In yet further embodiments, edge weights may be restricted to positive weights. Whatever their form, edge weights act as a measure of distance between any two nodes in the graph G. That is, determining a geodesic distance (i.e., a shortest path) includes determining a path between a node V corresponding to a given patch 404 and the virtual boundary node 406 such that the sum of the weights of its constituent edges E is minimized.

Accordingly, the geodesic saliency of a patch P may be computed according to Equation (1) as the accumulated edge weights along the shortest path from P to the virtual background node B on the graph G:

$$\text{saliency}(P) = \min_{P_1, P_2, \ldots, P_n, B} \Sigma_{i=1}^{n-1} \text{distance}(P_i, P_{i+1}) + \text{boundary wt.}(P_n, B) \quad (1)$$

Here $P_i$, is adjacent to $P_{i+1}$, and $P_n$ is connected by a boundary edge to B, the virtual background node 406. Equation (1) can be generalized as a "single-pair shortest path problem" where, given the edge weights of the undirected graph G, the shortest path from patch P in Equation (1) to the virtual boundary node B is the path $(P_1, P_2, \ldots, P_n, B)$ that, over all possible n, minimizes the sum of the edge weights of edges incident to adjacent nodes along the path from P to B, where $P_1 = P$. The minimized sum of the edge weights is the geodesic distance between the patch P and the virtual boundary node B, and the geodesic distance is said to be the length of this shortest path.

It is to be appreciated that various algorithms may be utilized to solve the single-pair shortest path problem, and Equation (1) is but one example algorithm to find the length of the shortest path from a node corresponding to a given patch 404 to the virtual background node 406. Some example alternative algorithms include, but are not limited to, the approximate shortest path algorithm described in P. J. Toivanen: "New geodesic distance transforms for gray-scale images," Pattern Recognition Letters 17 (1996) 437-450, Dijkstra's algorithm, and the A* search algorithm. Such algorithms are known to a person having ordinary skill in the art and are not explained further herein for conciseness.

In some embodiments, internal edge weights (i.e., weights of edges incident to adjacent nodes corresponding to two adjacent patches 404 of the image 400) may be computed as the appearance distance between adjacent patches 404 of the image 400. This distance measure should be consistent with human perception of how similar two patches are from a visual perspective; the more similar the adjacent patches, the smaller the internal edge weight of the edge incident on the adjacent patch nodes. On the other hand, the more dissimilar the adjacent patches, the larger the internal edge weight of the edge between them. For example, a background patch can be smoothly/easily connected to the virtual background node 406 without too much cost. By contrast, a foreground patch is more difficult to connect to the virtual background node 406 because the visual dissimilarity between the foreground and the background is usually very high. Thus, any path from inside an object in the image 400 is likely to go through a very "high cost" edge, which will make the shortest path from the patch inside the object to the virtual boundary node 406 more costly. In some embodiments, the patch appearance distance is taken as the difference (normalized to [0,1]) between the mean colors of two patches (e.g., in LAB color space), or the color histogram distance. However, any suitable patch appearance distance measure may be utilized without changing the basic characteristics of the system.

Figure 5:
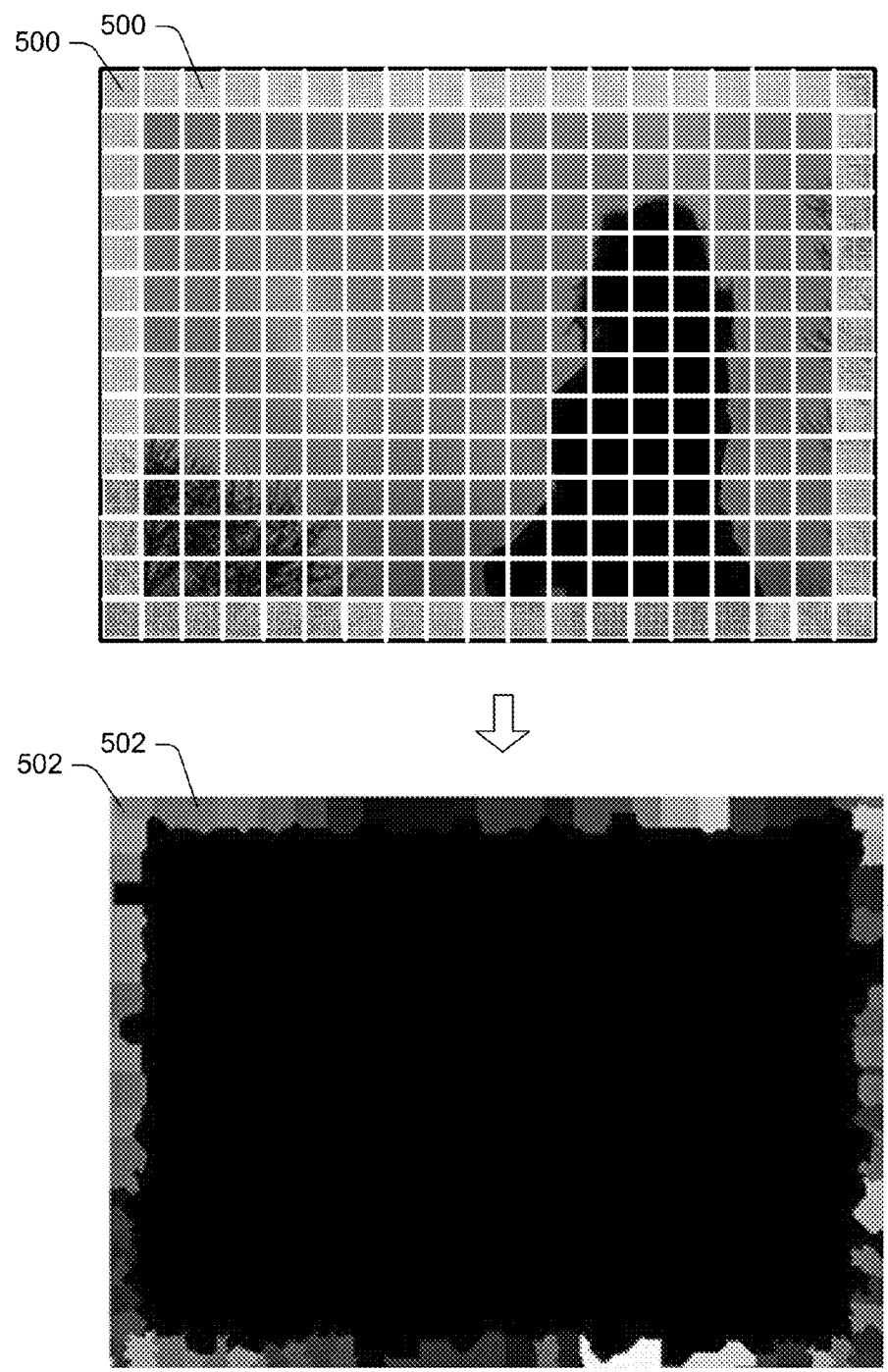
FIG. 5 illustrates an example determination of boundary weights for each of the patches at the boundary of the image.

FIG. 5 illustrates an example determination of boundary edge weights for each of the patches at the boundary of the image 400. The boundary patches 500 of the image 400 are highlighted in FIG. 5. In general, the boundary weight for a given boundary patch 500 characterizes how likely the given boundary patch 500 is the foreground of the image 400 (or how likely the boundary patch 500 is not background). The boundary weight computation accounts for exceptions to the boundary prior (because when the boundary prior is strictly valid, all boundary weights would be zero) so that the salient objects are detected, even if they touch the image boundary. Accordingly, the more likely a boundary patch 500 is foreground, the higher the boundary weight, and the more difficult it will be to connect the boundary patch 500 to the virtual background node 406. When a salient object is cropped by the image boundary, the boundary patches 500 on the object are more salient than the boundary patches 500 in the background. Thus, the boundary edge weight computation may be treated as a one-dimensional saliency detection problem. That is, given only image boundary patches 500,—the saliency of each boundary patch 500 may be computed as the weight of the boundary edge that connects the boundary patch 500 to the virtual background node 406. FIG. 5 shows the saliency map 502 of just the boundary patches 500 which may be used as the boundary weights for the boundary edges. The boundary weight may be based on any suitable computation of saliency that can be reduced to a one-dimensional version, such as the algorithm in S. Goferman, L. manor, A. Tal: "Context-aware saliency detection" In: CVPR (2010). In addition, computing the appearance distance between adjacent boundary patches 500 may be the mean color difference.

Figure 6:
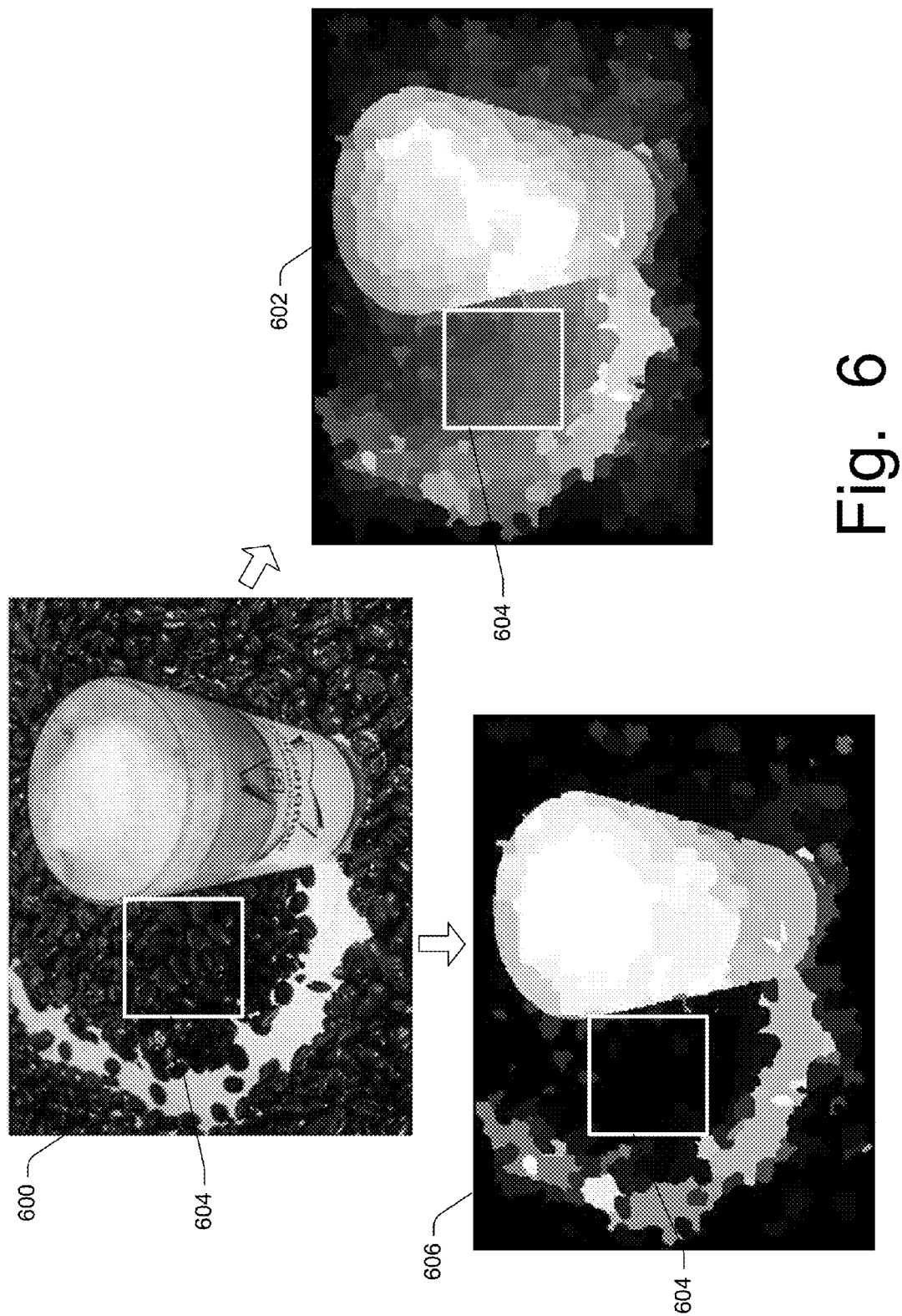
FIG. 6 illustrates an input image with a relatively textured background along with a geodesic saliency map that does not use weight clipping, and another geodesic saliency map that uses an example weight clipping technique.

Even for homogeneous backgrounds, simple appearance distances, such as color histogram distances, although usually small, are non-zero values. This causes a "small-weight-accumulation problem" where many internal edges with small weights can accumulate along a relatively long path from a patch at the center of the image 400 to the virtual background node 406. This may cause undesirably high saliency values in the center of the background. FIG. 6 illustrates an example input image 600 with a relatively complex background consisting mostly of coffee beans. The background, although textured, looks visually homogenous to the naked eye. FIG. 6 also shows a geodesic saliency map 602 that illustrates the small-weight accumulation problem where the area defined by the rectangle 604 shows high saliency values computed for the background patches near the center of the image 600. This is due to the accumulation of small internal edge weights along the shortest path from these center patches to the virtual background node 406.

To address the small-weight-accumulation problem illustrated in the geodesic saliency map 602, a "weight-clipping technique" can be utilized where the internal edge weights are clipped, or otherwise set, to zero if the internal edge weights are smaller than a threshold. The weight-clipping technique disclosed herein includes determining the internal edge weights between each adjacent patch of the image, such as the image 600 of FIG. 6. In some embodiments, the internal edge weights are the appearance distance between adjacent patches, wherein the appearance distance is taken as the difference (normalized to [0,1]) between the mean colors of two adjacent patches. Then, for each patch, the smallest appearance distance to all its neighbors is selected, and an "insignificance" distance threshold can be set as the median value of all such smallest distances of all the patches of the image 600. In some embodiments, an average (or mean) value may be designated as the threshold. To determine which internal edge weights need to be clipped to zero, the edge weights (or distances) of each internal edge are compared to the insignificance distance threshold, and if any of the internal edge weights are below the threshold, they are considered insignificant and clipped to zero. The result of such a weight-clipping technique is shown in the example geodesic saliency map 606. In the geodesic saliency map 606, where internal edge weights below the insignificance distance threshold were clipped to zero, the area defined by the rectangle 604 shows that the background is correctly represented as having low saliency values, indicative that the area is background and not part of a salient feature of the image 600.

Figure 7:
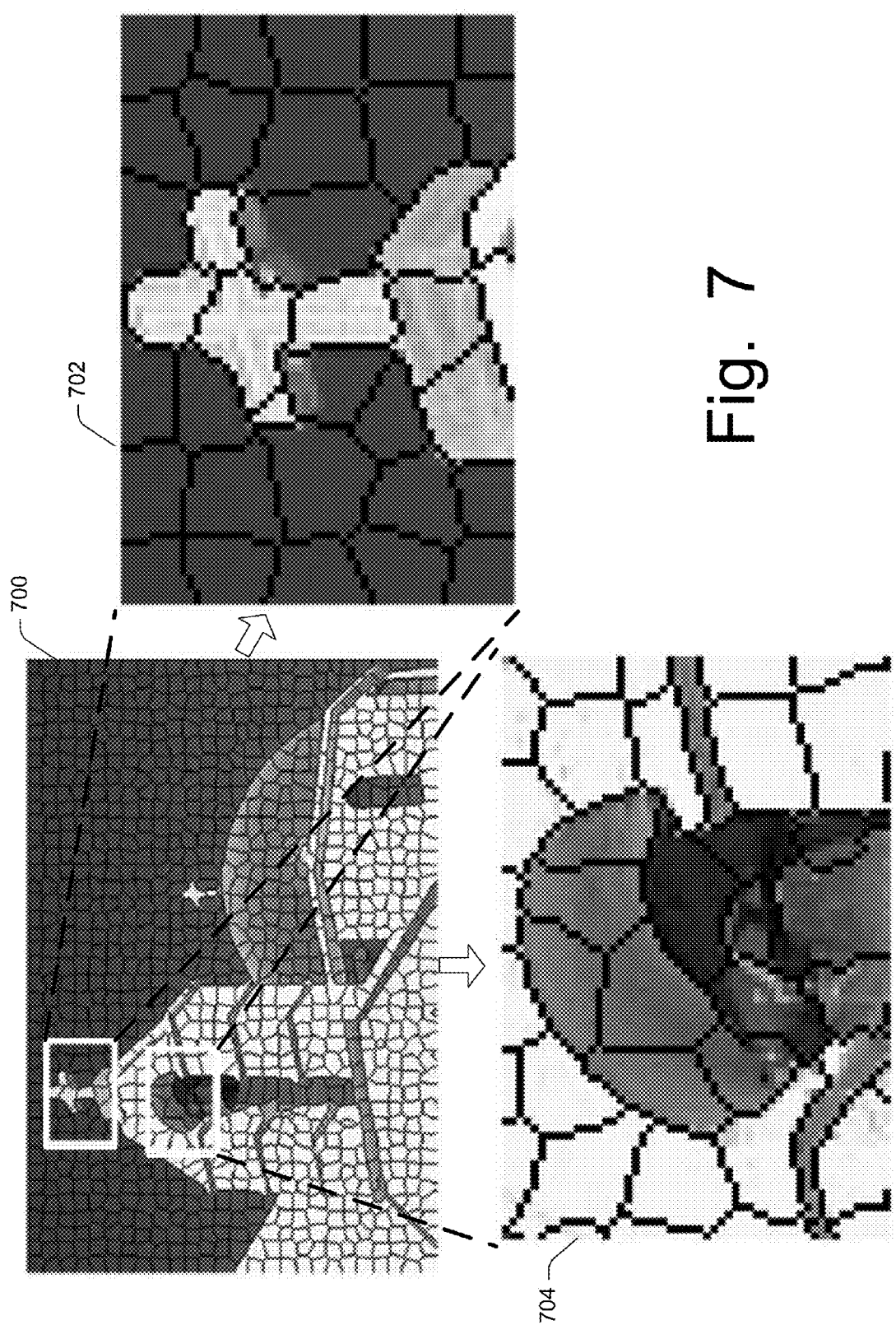
FIG. 7 illustrates an example input image that has been segmented according to another embodiment where the input image is divided into patches having irregular shapes, called "Superpixels," that are substantially aligned with the outline of objects in the input image.

FIG. 7 illustrates an example segmentation of an input image 700 according to another embodiment wherein the input image 700 may be divided into patches having an irregular shape. Such patches of irregular shape are called "Superpixels" herein. A characteristic of the Superpixels shown in FIG. 7 is that the Superpixel patches are substantially aligned with the outline of objects in the input image 700. The two cutout portions 702 and 704 of the image 700 illustrate how the Superpixel patches align with the boundary of the objects (in the case of FIG. 7, the object includes portions of a church steeple). For different practical needs, the embodiment shown in FIG. 7 using Superpixels can be used as a trade off for better accuracy in lieu of speed. That is, the rectangular patches 404 shown in FIG. 4 that are of substantially uniform size may be suitable for applications that require high speed, such as interactive image retargeting, image thumbnail generation/cropping for batch image browsing, and bounding box based object extraction, to name only a few example applications. On the other hand, for applications that require more accuracy, such as object segmentation, the Superpixel segmentation shown in FIG. 7 may be suitable. The geodesic saliency measure disclosed herein that utilizes Superpixels is more accurate because the Superpixels are better aligned with the object and background boundaries than regular-shaped patches are, and therefore the appearance distance between adjacent patches is more accurate with Superpixels. However, use of Superpixels is slower than using regular-shaped patches (i.e., on the order of a few seconds), so there is a trade off in using the Superpixel embodiment of FIG. 7.

Measuring geodesic saliency using regular-shaped patches (e.g., rectangular, square, triangle, etc.), such as the patches 404 of FIG. 4, is sometimes called the "Geodesic Saliency (GS) Grid algorithm" herein. In some embodiments, the patches 404 may be within a range between $\frac{1}{80}$ and $\frac{1}{20}$ of the image dimension. Preferably, the patch size may be approximately $\frac{1}{40}$ of the image size. For an image of 400×400 pixels, a patch size of 10×10 pixels on a regular image grid is preferred. The shortest paths for all patches 404 may be computed using any of the aforementioned algorithms, such as the approximate shortest path algorithm described in P. J. Toivanen "New geodesic distance transforms for gray-scale images," Pattern Recognition Letters 17 (1996) 437-450. Although the solution using such an algorithm would be approximate, it is very close to an exact solution on a simple graph from an image grid of rectangular, uniform patches 404. Because of its linear complexity in the number of graph nodes and sequential memory access (therefore cache friendly), it is extremely fast and also suitable for use in interactive image segmentation. The GS Grid algorithm that utilizes regular-shaped patches 404 runs in approximately 2 milliseconds for images of moderate size (e.g., 400×400).

Measuring geodesic saliency using the aforementioned Superpixels of FIG. 7 is sometimes called the "GS Superpixel algorithm" herein. In some embodiments, a Superpixel segmentation algorithm, such as the algorithm described in O. Veksler, Y. Boykov, P. Mehrani: "Superpixels and supervoxels in an energy optimization framework," In: ECCV (2010), may be utilized to produce Superpixels of approximately 10×10 pixels. However, it is to be appreciated that any suitable algorithm to segment an image, such as the image 700 of FIG. 7, into irregular-shaped pixels of any suitable size may be used without changing the basic characteristics of the system. Additionally, any suitable algorithm for the geodesic saliency measure may be used with the Superpixels of FIG. 7, such as Dijkstra's algorithm to determine the shortest path between each of the Superpixel patches and the virtual boundary node 406.

Example Processes

Figure 8:
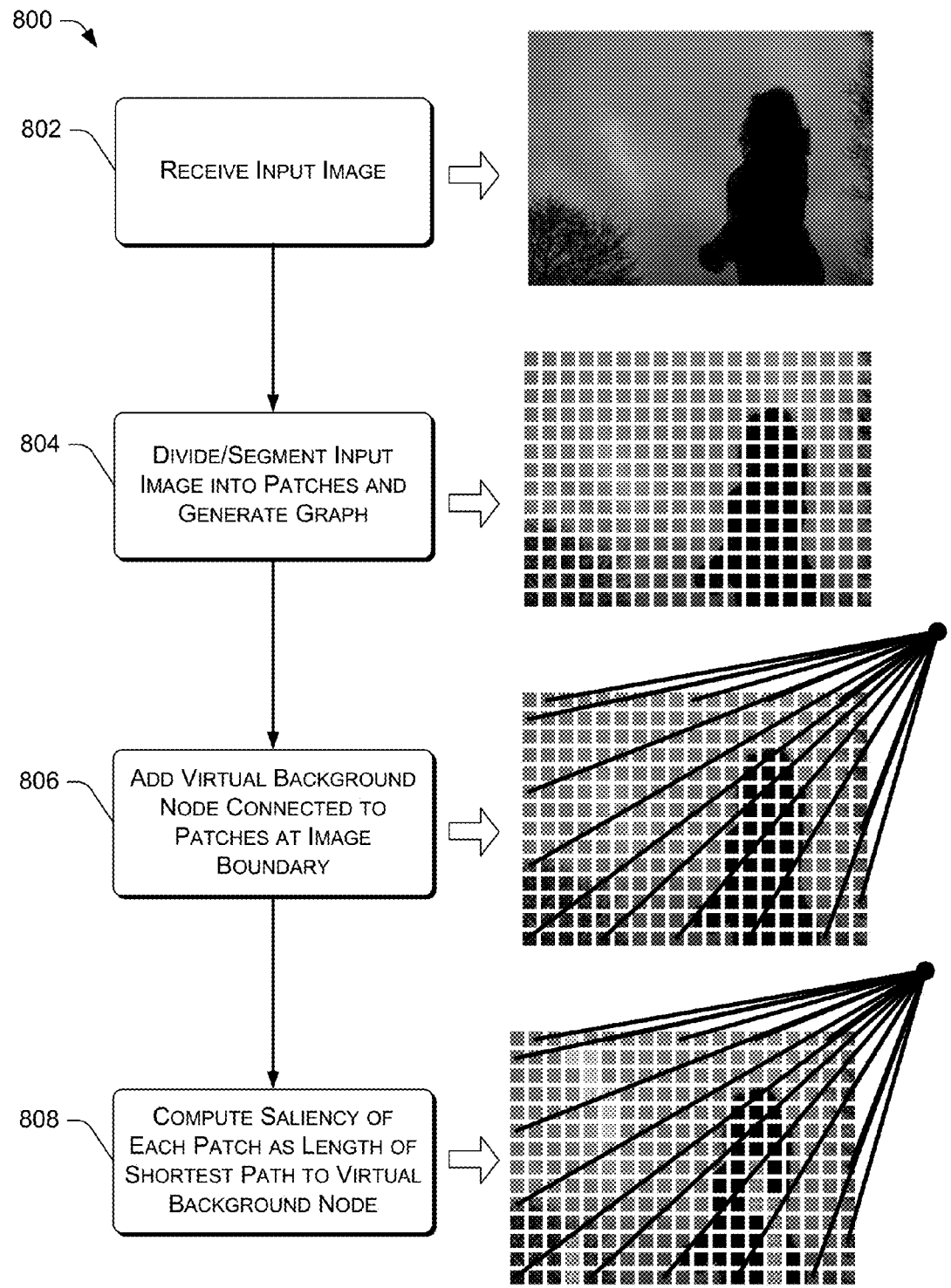
FIG. 8 is a flow diagram of an illustrative process to compute geodesic saliency of an image.
Figure 9:
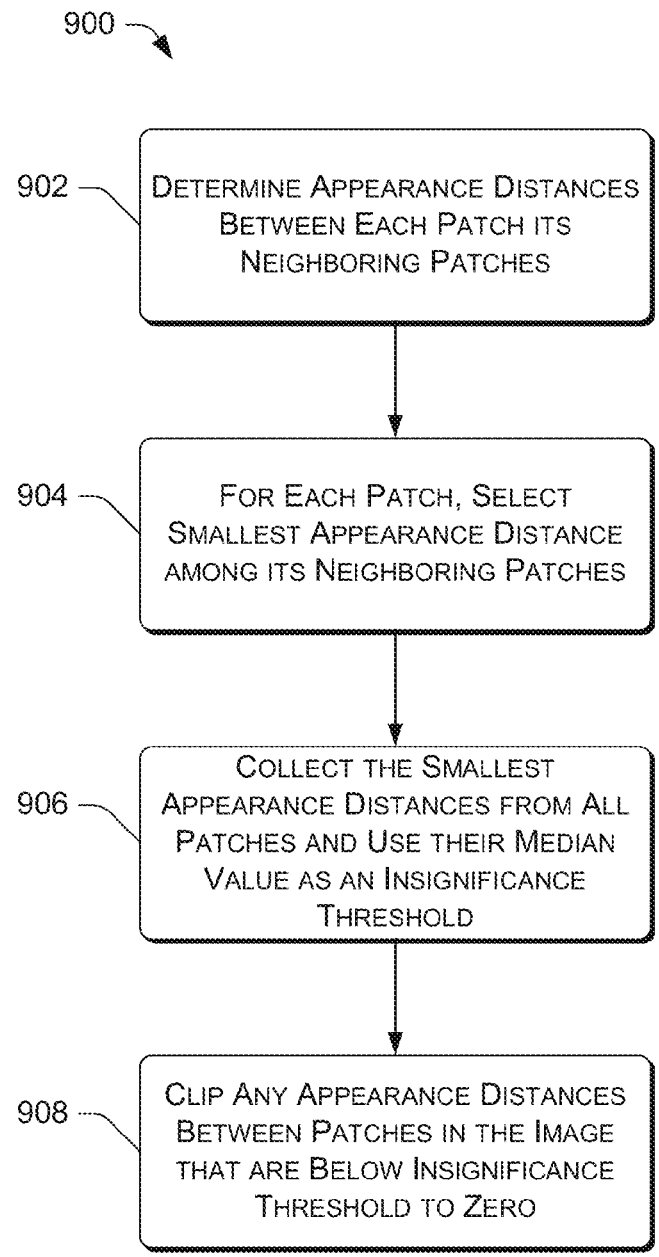
FIG. 9 is a flow diagram of an illustrative process of weight clipping internal edge weights.

FIGS. 8 and 9 describe illustrative processes that are illustrated as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 8 is a flow diagram of an illustrative process 800 to compute geodesic saliency of an image. For discussion purposes, the process 800 is described with reference to the input image 400 of FIG. 4, which is shown at the right of FIG. 8, as implemented in the geodesic saliency computation system 202 of FIG. 2.

At 802, the geodesic saliency computation system 202 receives an input image, such as the input image 400 of FIG. 4. At 804, the input image is segmented into a plurality of patches, such as the regular-shaped patches 404 of FIG. 4, and a graph G may be generated to represent the image 400 as a plurality of nodes V that correspond to the plurality of patches created by the segmentation at 804, and edges E that connect adjacent nodes V In other embodiments, the patches may be of an irregular shape, such as the Superpixel patches shown in FIG. 7. In some embodiments, the patches are approximately $\frac{1}{40}$ of the image size (e.g., 10×10 pixel patches for a 400×400 size image).

At 806, a virtual background node B, such as the virtual background node 406, may be added to the graph G, wherein the virtual background node B is connected via boundary edges to the nodes V that correspond to the patches at the image boundary, such as the boundary patches 500 of FIG. 5. In some embodiments, boundary weights of the boundary edges may be computed based on a suitable saliency measure for the boundary patches 500.

At 808, the saliency of each patch may be computed, by the geodesic saliency computation system 202, as a length of a shortest path to the virtual background node B. Any suitable algorithm may be used for the shortest path determination, and the algorithm of Equation (1) is exemplary.

FIG. 9 is a flow diagram of an illustrative process 900 for clipping weights of internal edges that are below an insignificance distance threshold. The illustrative process 900 may be executed in conjunction with the process 800 of FIG. 8 to augment the process 800 and give background regions near the center of the image more accurate saliency measures. For discussion purposes, the process 900 is described with reference to the weight-clipping technique shown in FIG. 6, as well as the geodesic saliency computation system 202 of FIG. 2.

At 902, the geodesic saliency computation system 202 may determine appearance distances between each patch of a segmented image and its neighboring patches. For example, the segmented image generated after step 804 of FIG. 8 may create defined patches, and the appearance distances between each respective patch and those patches neighboring the respective patch may be determined at 902.

At 904, the geodesic saliency computation system 202 may select a smallest appearance distance among the appearance distances determined at 902 for each patch. That is, for a given patch, the smallest appearance distance among the given patch and each of its neighbors is selected at 904.

At 906, all of the smallest appearance distances that were selected at 904 are collected to determine a median value of the smallest appearance distances from all of the patches. This median value is then set as an insignificance distance threshold. At 908, the appearance distances determined at 902 are compared to the threshold determined at 906, and any appearance distances that are below the threshold are clipped, or otherwise set, to zero.

Example Computing Device

Figure 10:
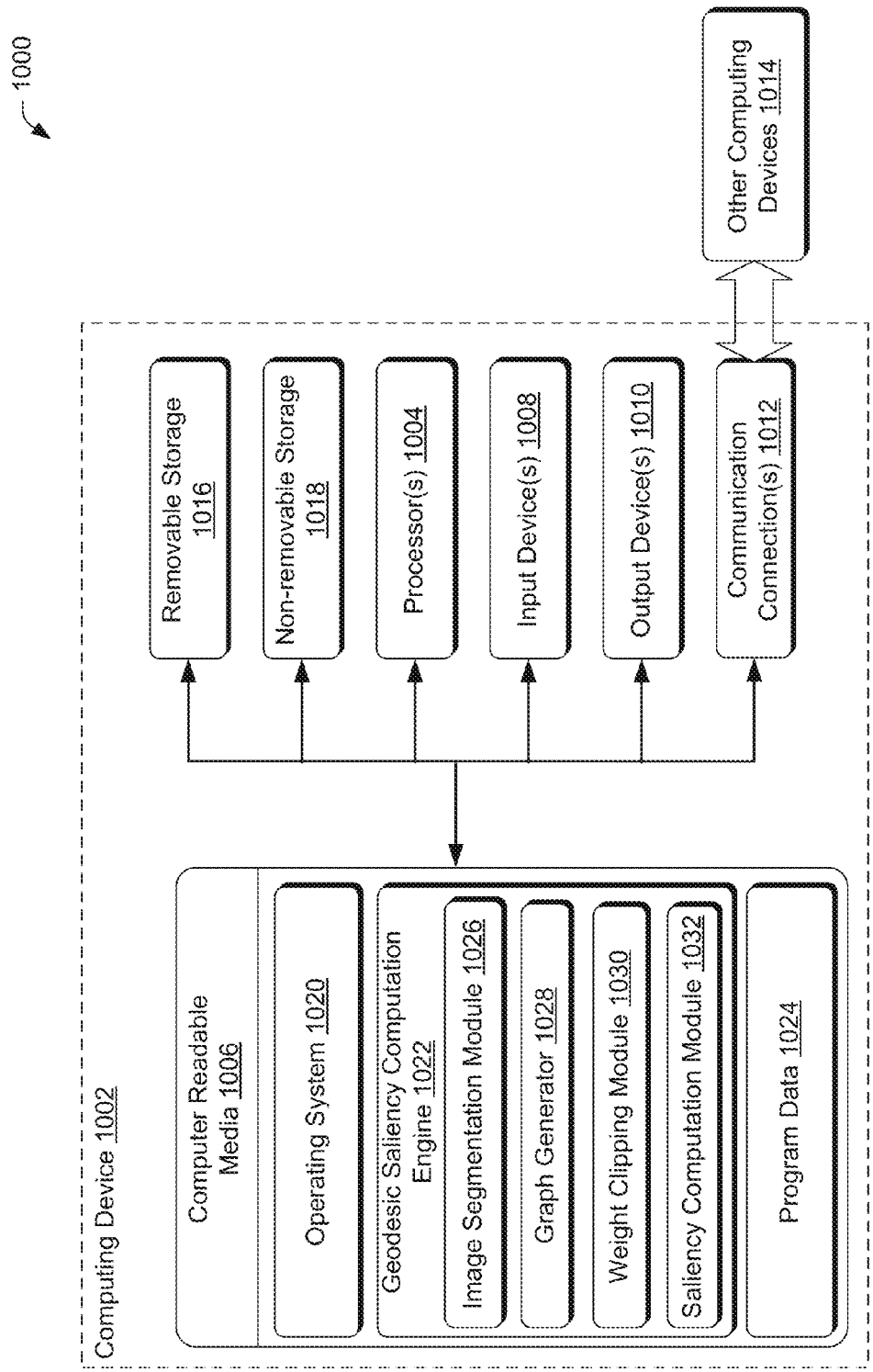
FIG. 10 illustrates an example computing system environment to implement the geodesic saliency computation disclosed herein.

FIG. 10 illustrates a representative system 1000 that may be used as an implementation of the geodesic saliency computation system 202 of FIG. 2. It is to be appreciated, however, that the techniques and mechanisms may be implemented in other systems, computing devices, and environments. The system 1000 may include a computing device 1002 that may be operable to facilitate geodesic saliency computation according to the embodiments disclosed herein.

In at least one configuration, the computing device 1002 comprises the one or more processors 1004 and computer-readable media 1006. The computing device 1002 may also include one or more input devices 1008 and one or more output devices 1010. The input devices 1008 may be a camera, keyboard, mouse, pen, voice input device, touch input device, etc., and the output devices 1010 may be a display, speakers, printer, etc. coupled communicatively to the processor(s) 1004 and the computer-readable media 1006. The output devices 1010 may be configured to facilitate output or otherwise rendering the saliency map(s) 206 of FIG. 2, and the input devices 1008 may be configured to facilitate input of the input image(s) 204 of FIG. 2. The computing device 1002 may also include communications connection(s) 1012 that allow the computing device 1002 to communicate with other computing devices 1014 such as via a network or a point-to-point connection. In particular, input images 204 that were recorded via an external mechanism may be input from the other computing devices 1014 to the communication connection(s) 1012.

The computing device 1002 may have additional features and/or functionality. For example, the computing device 1002 may also include additional data storage devices (removable and/or non-removable) such as, for example, magnetic disks, optical disks, or tape. Such additional storage may include removable storage 1016 and/or non-removable storage 1018. Computer-readable media 1006 may include, at least, two types of computer-readable media 1006, namely computer storage media and communication media. Computer storage media may include volatile and non-volatile, removable, and non-removable media implemented in any method or technology for storage of information, such as computer readable instructions, data structures, program modules, or other data. The computer readable media 1006, the removable storage 1016 and the non-removable storage 1018 are all examples of computer storage media. Computer storage media includes, but is not limited to, random access memory (RAM), read-only memory (ROM), erasable programmable read-only memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other non-transmission medium that can be used to store the desired information and which can be accessed by the computing device 1002. Any such computer storage media may be part of the computing device 1002. Moreover, the computer-readable media 1006 may include computer-executable instructions that, when executed by the processor(s) 1004, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computer-readable media 1006 of the computing device 1002 may store an operating system 1020, a geodesic saliency computation engine 1022 with its various modules and components, and may include program data 1024. The geodesic saliency computation engine 1022 may include an image segmentation module 1026 to segment input images into a plurality of patches, as described herein, a graph generator 1028 to generate a graph G, with patch nodes V and a virtual boundary node B and edges E therebetween, as described herein, a weight clipping module 1030 to clip internal edge weights below a threshold to zero, as described herein, and a saliency computation module 1032 to compute saliency values for each of the plurality of patches as a shortest path to the virtual background node B.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described

CONCLUSION

In closing, although the various embodiments have been described in language specific to structural features and/or methodological acts, it is to be understood that the subject matter defined in the appended representations is not necessarily limited to the specific features or acts described.

Rather, the specific features and acts are disclosed as example forms of implementing the claimed subject matter.

The invention claimed is:

1. A method comprising:
segmenting, by one or more processors, an image having an array of image pixels into a plurality of patches, each patch including one or more of the image pixels;
generating a graph of the image, the graph comprising a set of patch nodes and a set of internal edges connecting the patch nodes to each other, the set of patch nodes corresponding to the plurality of patches and including a subset of patch nodes corresponding to boundary patches at a boundary of the image;
adding a virtual background node to the set of patch nodes of the graph;
connecting the subset of patch nodes corresponding to the boundary patches to the virtual background node by a set of boundary edges;
computing, by the one or more processors, a length of a shortest path from each patch node to the virtual background node; and
designating respective lengths as a saliency value for each patch to create a saliency map of the image.

2. The method of claim 1, wherein the internal edges are associated with internal edge weights and the boundary edges are associated with boundary edge weights.

3. The method of claim 2, wherein the computing the length of the shortest path from each patch node to the virtual background node comprises summing one or more of the internal edge weights and one of the boundary edge weights along the shortest path from each patch node to the virtual background node.

4. The method of claim 2, wherein the internal edge weights are each a measure of an appearance distance between adjacent patches, and the boundary edge weights are each a measure of a likelihood that a patch at the boundary of the image is not in a background of the image.

5. The method of claim 4, further comprising:
for each of the plurality of patches:
determining appearance distances between the patch and each patch neighboring the patch; and
selecting a smallest appearance distance among the determined appearance distances;
from the smallest appearance distances selected for the plurality of patches, designating a median value of the smallest appearance distances as a threshold; and
setting internal edge weights to zero for any of the internal edge weights that are associated with appearance distances that are below the threshold.

6. The method of claim 1, wherein the plurality of patches are of a substantially regular shape and a substantially uniform size.

7. The method of claim 1, wherein the plurality of patches are substantially rectangular.

8. The method of claim 1, wherein the plurality of patches are substantially irregular in shape, and at least some of the plurality of patches have a border that is substantially aligned with an outline of an object in the image.

9. The method of claim 1, further comprising detecting an object in the image based at least in part on the saliency map of the image.

10. A system comprising:
one or more processors; and
one or more memories comprising:
an image segmentation module maintained in the one or more memories and executable by the one or more processors to segment an image into a plurality of patches;
a graph generator maintained in the one or more memories and executable by the one or more processors to generate a graph of the image, the graph comprising a set of patch nodes corresponding to the plurality of patches, and to add a virtual background node to the set of patch nodes of the graph; and
a saliency computation module maintained in the one or more memories and executable by the one or more processors to compute, for each of the plurality of patches, a saliency value as a length of a shortest path from an individual patch node to the virtual background node, and to create a saliency map of the image based at least in part on the saliency values.

11. The system of claim 10, further comprising an output device to output the saliency map of the image.

12. The system of claim 10, wherein the graph further comprises a set of edges including internal edges between adjacent patch nodes and boundary edges between patch nodes at a boundary of the image and the virtual background node, and wherein the internal edges are associated with internal edge weights and the boundary edges are associated with boundary edge weights.

13. The system of claim 12, further comprising a weight clipping module maintained in the one or more memories and executable by the one or more processors to compare the internal edge weights to a threshold, and, for any of the internal edge weights that are below the threshold, to set the internal edge weights to zero.

14. The system of claim 13, wherein the threshold is determined as a median value of a plurality of smallest appearance distances between each of the plurality of patches and neighboring patches.

15. The system of claim 12, wherein the internal edge weights are each a measure of an appearance distance between adjacent patches, and the boundary edge weights are each a measure of a likelihood that a patch at the boundary of the image is not in a background of the image.

16. One or more computer storage media storing computer-executable instructions that, when executed, cause one or more processors to perform acts comprising:
segmenting an image into a plurality of patches;
generating a graph of the image, the graph comprising a set of patch nodes corresponding to the plurality of patches;
adding a virtual background node to the set of patch nodes of the graph;
for each of the plurality of patches, computing a saliency value as a length of a shortest path from an individual patch node to the virtual background node; and
creating a saliency map of the image based at least in part on the saliency values.

17. The one or more computer storage media of claim 16, wherein the graph further comprises a set of edges including internal edges between adjacent patch nodes and boundary edges between patch nodes at a boundary of the image and the virtual background node, and wherein the internal edges are associated with internal edge weights and the boundary edges are associated with boundary edge weights.

18. The one or more computer storage media of claim 17, the acts further comprising determining the length of the shortest path by summing one or more of the internal edge weights and one of the boundary edge weights along the shortest path from the individual patch node to the virtual background node.

19. The one or more computer storage media of claim 17, the acts further comprising:

comparing the internal edge weights to a threshold, and, for any of the internal edge weights that are below the threshold, setting the internal edge weights to zero.

20. The one or more computer storage media of claim 16, wherein the plurality of patches are substantially irregular in shape, and at least some of the plurality of patches have a border that is substantially aligned with an outline of an object in the image.

* * * * *